Patented Dec. 6, 1932

1,890,256

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

PROCESS OF PREPARING AMINO-DIARYL ETHERS

No Drawing.  Application filed March 19, 1928.  Serial No. 262,994.

Heretofore the only known method for making amino-diaryl-ethers (see article by C. Haeussermann and H. Teichmann, Ber. 29, II, 1446) has been to reduce the corresponding nitro-diaryl-ethers. I have now discovered that compounds of the class in question can be much more readily produced from the corresponding halogen diaryl-ethers by treating them with an aqueous or alcoholic solution of ammonia in the presence of a catalyst. Such improved method is believed to be distinctly different from the one thus known and can be applied to all halogenated diaryl-ethers, both mono and poly-halogen-ethers. Furthermore in the case of poly-halogen-diaryl-ethers, especially those with different halogens, as chlorine and bromine, or iodine, in the same molecule, it is possible to produce pure amino compounds which still contain halogen, although, if desired, in the case of such poly-halogen-diaryl-ethers, the replacement of the entire halogen by ammonia can be accomplished with almost no formation of by-products.

To the accomplishment of the foregoing and related ends, the invention, then, consists of the steps hereinafter fully described and particularly pointed out in the claims, the following description setting forth but several of the various ways in which the principle of the invention may be utilized.

As indicated, the starting material for the present reaction is the halogenated diaryl-ether corresponding with the amino-diaryl-ether which is to be produced. Such halogenated diaryl-ethers are formed from the corresponding ethers in the usual way, e. g., from diphenyl ether, phenyl naphthyl ether, di-naphthyl ether and the homologues or derivatives of such ethers, which have no interfering group, all of which may be used in the present process.

Both of the most used halogens, viz: chlorine and bromine, are well adapted for use in making such halogenated diaryl-ethers. Furthermore, in the case of poly-halogen-diaryl-ethers, a different halogen may be attached to the respective aryl groups. The reaction with ammonia is preferably carried out under pressure at temperatures from approximately 150° to approximately 250° C., the ammonia being employed in the form of an aqueous or alcoholic solution, and a suitable catalyst being also employed, such catalyst being preferably a cuprous compound, e. g., cuprous oxide or chloride.

By way of specific example, in order to make 4-4′ diamino-diphenyl-ether the following ingredients, viz:—

| | Parts |
|---|---|
| Aqueous ammonia sp. gr. 0.9 | 70 |
| 4-4′-dibrom-diphenyl-ether | 33 |
| Cuprous oxide | 7 | are heated under pressure for ten hours to 170° C. The pressure employed corresponds, approximately, to the vapor tension of the reacting ingredients at the temperature in question. At the end of the period indicated the pressure is relieved, the reaction product, which consists of diamino-diphenyl-ether, is washed with water, dissolved in dilute acid and precipitated with ammonia, following which it can be used without any further purification.

If, instead of the dibrom-diphenyl-ether called for in the example just given, a proportional amount of chlor-brom-diphenyl-ether is employed with approximately one-half the indicated amounts of the other ingredients, the resulting product will consist of chlor-amino-diphenyl-ether.

Similarly, instead of such dibrom-diphenyl-ether the dichlor-compound can, of course, be employed with the production of the same product as before, viz: diamino-diphenyl ether. So too, instead of a halogenated diphenyl-ether, a correspondingly halogenated naphthyl-phenyl-ether may be employed in the process with resulting replacement of one or both halogens with the amino group. This would apply generally to the homologues of benzene and naphthalene.

Depending upon the location of the halogen with respect to the benzene ring or equivalent aryl group, the resulting amino compound will have the amino group located in the ortho or para position. The products produced by this process are particularly valuable as intermediates for dyes, although not necessarily limited to such use.

It should be stated that in the practical utilization of the process, the reaction will be preferably carried out in a pressure vessel provided with heating means and suitable stirring means, whereby the reacting ingredients may be maintained in reactive relation and, in particular, the catalyst in a satisfactory state of suspension. For example, such vessel may be mounted upon trunnions, one or both of which is provided with suitable openings for inlet and outlet purposes, as for charging and emptying the vessel, and with driving gear to rotate said vessel for the purpose of agitating the contents. Heat may be applied by means of jacket heating, provision for supply of steam to same being through stuffing boxed connections at one or both trunnions, or the reactor may rotate in a hot air bath, or be heated by electric space heaters or any other method convenient.

Other modes of applying the principle of the invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method for making amino-diaryl ethers, the step which consists in reacting between the corresponding halogenated diaryl ether and ammmonia.

2. In a method for making amino-diaryl ethers, the step which consists in reacting under pressure at a temperature of from 150° to 250° C., a mixture of the corresponding halogenated diaryl ether and an aqueous solution of ammonia.

3. In a method for making amino-diaryl ethers, the step which consists in heating under pressure at a temperature of from 150° to 250° C., a mixture of the corresponding halogenated diaryl ether and an aqueous solution of ammonia in the presence of a cuprous compound as a catalyst.

4. In a method for making amino-diaryl ethers, the step which consists in heating under pressure at a temperature of from 150° to 250° C., a mixture of the corresponding halogenated diaryl ether and an aqueous solution of ammonia in the presence of cuprous oxide as a catalyst.

5. In a method of making 4-4'-diamino diphenyl ether, the step which consists in reacting between the corresponding halogenated diphenyl ether and ammonia.

6. In a method of making 4-4'-diamino diphenyl ether, the step which consists in reacting between 4-4'-dihalogen diphenyl ether and ammonia in the presence of a copper-containing catalyst.

7. In a method for making an amino-diphenyl ether, the step which consists in reacting between halogenated diphenyl ether and ammonia.

8. In a method for making an amino-diphenyl ether, the step which consists in reacting between dihalogenated diphenyl ether and ammonia solution.

9. In a method for making an amino-diphenyl ether, the step which consists in heating under pressure to a temperature of approximately 170° C. a mixture of dibromdiphenyl ether and aqueous ammonia solution in the presence of a cuprous compound as a catalyst.

10. In a method for making an amino-diphenyl ether, the step which consists in heating under pressure to a temperature of approximately 170° C. a mixture of dibromdiphenyl ether and aqueous ammonia solution in the presence of cuprous oxide as a catalyst.

11. In a method of making 4.4'-diaminodiphenyl-ether, the step which consists in acting between the corresponding halogenated-diphenyl-ether and ammonia in the presence of a cuprous compound as a catalyst.

12. In a method of making 4.4'-diaminodiphenyl-ether, the step which consists in reacting between the corresponding halogenated-diphenyl-ether and ammonia in the presence of cuprous oxide as a catalyst.

13. In a method of making 4.4'-diaminodiphenyl-ether, the step which consists in reacting between 4.4'-dichloro-diphenyl ether and ammonia in the presence of a cuprous compound as a catalyst.

14. In a method of making 4.4'-diaminodiphenyl-ether, the step which consists in reacting between 4.4'-dichloro-diphenyl ether and ammonia in the presence of cuprous oxide as a catalyst.

15. The method of making an amino-halodiaryl ether which comprises reacting a diaryl ether, which is substituted by two different halogens, with ammonia, whereby the more reactive halogen substituent is replaced by an amino group.

16. The method of making an amino-chloro-diaryl ether which comprises reacting a bromo-chloro-diaryl ether with ammonia.

17. The method of making an amino-chloro-diphenyl ether which comprises reacting a bromo-chloro-diphenyl ether with ammonia.

Signed by me this 2nd day of March, 1928.

ERNEST F. GRETHER.